United States Patent
Knoll et al.

(10) Patent No.: US 8,279,087 B2
(45) Date of Patent: Oct. 2, 2012

(54) METHOD FOR DETERMINING A PARKING SPOT

(75) Inventors: Peter Knoll, Ettlingen (DE); Andreas Engelsberg, Hildesheim (DE); Dietrich Manstetten, Ehningen (DE); Holger Kussmann, Giesen (DE); Lars Placke, Hannover (DE); Marc Stoerzel, Lippstadt (DE); Ulrich Schweiger, Stuttgart (DE); Wei-Chia Lee, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 1243 days.

(21) Appl. No.: 10/578,929

(22) PCT Filed: Sep. 17, 2004

(86) PCT No.: PCT/EP2004/052223
§ 371 (c)(1),
(2), (4) Date: Jun. 12, 2008

(87) PCT Pub. No.: WO2005/044619
PCT Pub. Date: May 19, 2005

(65) Prior Publication Data
US 2008/0231469 A1    Sep. 25, 2008

(30) Foreign Application Priority Data

Nov. 6, 2003  (DE) .................................. 103 51 894

(51) Int. Cl.
*G08G 1/14*    (2006.01)
(52) U.S. Cl. ......................... 340/932.2; 340/436; 701/41
(58) Field of Classification Search ............... 340/932.2, 340/436, 437, 438; 701/41, 42, 44
See application file for complete search history.

(56) References Cited

U.S. PATENT DOCUMENTS

| | | | |
|---|---|---|---|
| 4,931,930 A * | 6/1990 | Shyu et al. ...................... 701/36 |
| 6,587,759 B2 * | 7/2003 | Obradovich et al. ............. 701/1 |
| 7,117,073 B2 * | 10/2006 | Endo et al. ...................... 701/28 |
| 2003/0058337 A1 * | 3/2003 | Tanaka et al. ................. 348/116 |
| 2004/0119610 A1 * | 6/2004 | Maemura et al. .......... 340/932.2 |
| 2007/0057816 A1 * | 3/2007 | Sakakibara et al. ........ 340/932.2 |
| 2008/0027793 A1 * | 1/2008 | Taylor ............................ 705/13 |
| 2008/0033647 A1 * | 2/2008 | Milark et al. .................. 701/300 |
| 2008/0211651 A1 * | 9/2008 | Beutnagel-Buchner et al. ............................ 340/459 |
| 2010/0152972 A1 * | 6/2010 | Attard et al. .................... 701/42 |

FOREIGN PATENT DOCUMENTS

| DE | 198 47 013 | 4/2000 |
|---|---|---|
| EP | 1 352 782 | 10/2003 |

\* cited by examiner

*Primary Examiner* — George Bugg
*Assistant Examiner* — Edny Labbees
(74) *Attorney, Agent, or Firm* — Kenyon & Kenyon LLP

(57) ABSTRACT

A method for determining a parking spot including at least the following steps: measuring a parking spot and outputting a measured length of the parking spot; comparing the determined length to at least one limiting value and determining an indicator signal; outputting the indicator signal to the driver; recording vehicle dynamics signals, during a parking operation; evaluating the parking operation on the basis of the recorded vehicle dynamics signals and outputting an evaluation signal, and changing the at least one limiting value as a function of the evaluation signal and the indicator signal. An adaptive parking spot measurement is created in which an evaluation of the parking spot length is automatically adapted to the driving behavior and the driving skills of the respective driver, resulting in a particularly high degree of acceptance of the PSM system by the driver.

13 Claims, 2 Drawing Sheets

METHOD FOR DETERMINING A PARKING SPOT

FIELD OF THE INVENTION

The present invention relates to a method for determining a parking spot.

BACKGROUND INFORMATION

Different driver assist systems are known for supporting a parking operation, e.g., park pilots which calculate a trajectory for a parking operation and output driving instructions to the driver for executing the parking operation. Such driver assist systems use systems for parking spot measurement (PSM) which determine the length and the relative position of a parking spot to the vehicle via ultrasound sensors or radar sensors, for example, and which, as a function of the length of the vehicle and possibly the required trajectory for the parking operation, assign the parking operation to one of three categories, i.e., impossible, possible but difficult, possible and easy.

However, use of such a PSM system by untrained and unsure drivers in particular may result in the driver's own driving skills not meeting the possibilities evaluated by the system. An untrained driver, for example, may not be able to use a parking spot, rated as possible, for a parking operation, possibly even after multiple attempts. Moreover, a parking spot, rated as easy, may be used by the driver only after multiple, difficult attempts, and may involve a great lateral distance from the roadside. On the other hand, a trained driver may easily navigate parking spots rated as difficult and may even use parking spots rated as not possible after a complicated parking operation involving multiple driving direction changes.

These deviations of the actual possibilities due to a driver's own driving skills and the evaluation determined by the PSM system may result in the driver no longer using the offered system because he views his driving skills as being underestimated or assesses the evaluations as useless. Therefore, such systems partly experience a low degree of acceptance by the users.

SUMMARY OF THE INVENTION

The method according to the present invention has the particular advantage over the related art that the evaluations carried out by the PSM system may be adapted to the driving behavior and driving skills of the respective driver. The system also automatically adapts itself to the driver's changing driving skills and driving habits, thereby achieving a particularly high degree of acceptance of the PSM system by the driver since, after at least a few misinterpretations, the evaluations carried out by the PSM system correspond to the individual skills. The driver and the adaptive PSM system of the present invention are thus able to adjust to one another.

The present invention is based on the idea of dividing the respective parking spots into at least two, preferably at least three, categories using suitable limiting values and to adapt the selected limiting values as a function of the driving behavior determined during the parking operations. At least one limiting value, advantageously at least two limiting values, i.e., one lower limiting value which separates the sections into not possible and medium-difficult, and an upper limiting value which separates the sections into medium-difficult and easy, are selected to classify the categories.

A parking operation may be recognized, for example, on the basis of the driver's request to begin the procedure for parking spot measurement or a park pilot or parking aid function. The end of the parking operation may advantageously be recognized when the engine is shut off and the vehicle is in the targeted parking spot.

The evaluation of the respective driving operation or driving behavior during the parking operation may be limited to the simple evaluation "successful" or "not successful"; a more accurate differentiation is advantageously carried out via recorded vehicle dynamics data, e.g., the number or the frequency of the steering angle characteristics or changes in the steering angle characteristics and the number of driving direction changes until the end position is reached, so that successful parking operations may be categorized as easy and medium-difficult or also additional categories.

The initially selected limiting values may subsequently be compared to the evaluation of the driving behavior. If a parking spot, initially evaluated as possible, is not able to be accessed by the driver, at least the lower limiting value, which separates insufficient, inaccessible parking spots from slightly larger parking spots accessible with medium difficulty, should be raised. An upper limiting value, which separates parking spots accessible with medium difficulty from easily accessible parking spots, should advantageously also be raised in this case so that the middle section between the limiting values does not become too small. If the driver accesses a parking spot, the limiting values may be lowered slightly; a more accurate differentiation of the driving behavior is carried out when the parking spot is accessed and during a parking operation, which is rated to be complicated due to complex driving behavior involving, for example, many steering angle characteristics or frequent steering angle changes and frequent driving direction changes, the limiting values are not lowered and may even be raised slightly.

According to the present invention, the adaptive method for parking spot measurement may, for example, indicate to the driver in a short message via the on-board computer, for the purpose of further motivation, a definite improvement in his driving skills.

DETAILED DESCRIPTION

Figure 1:
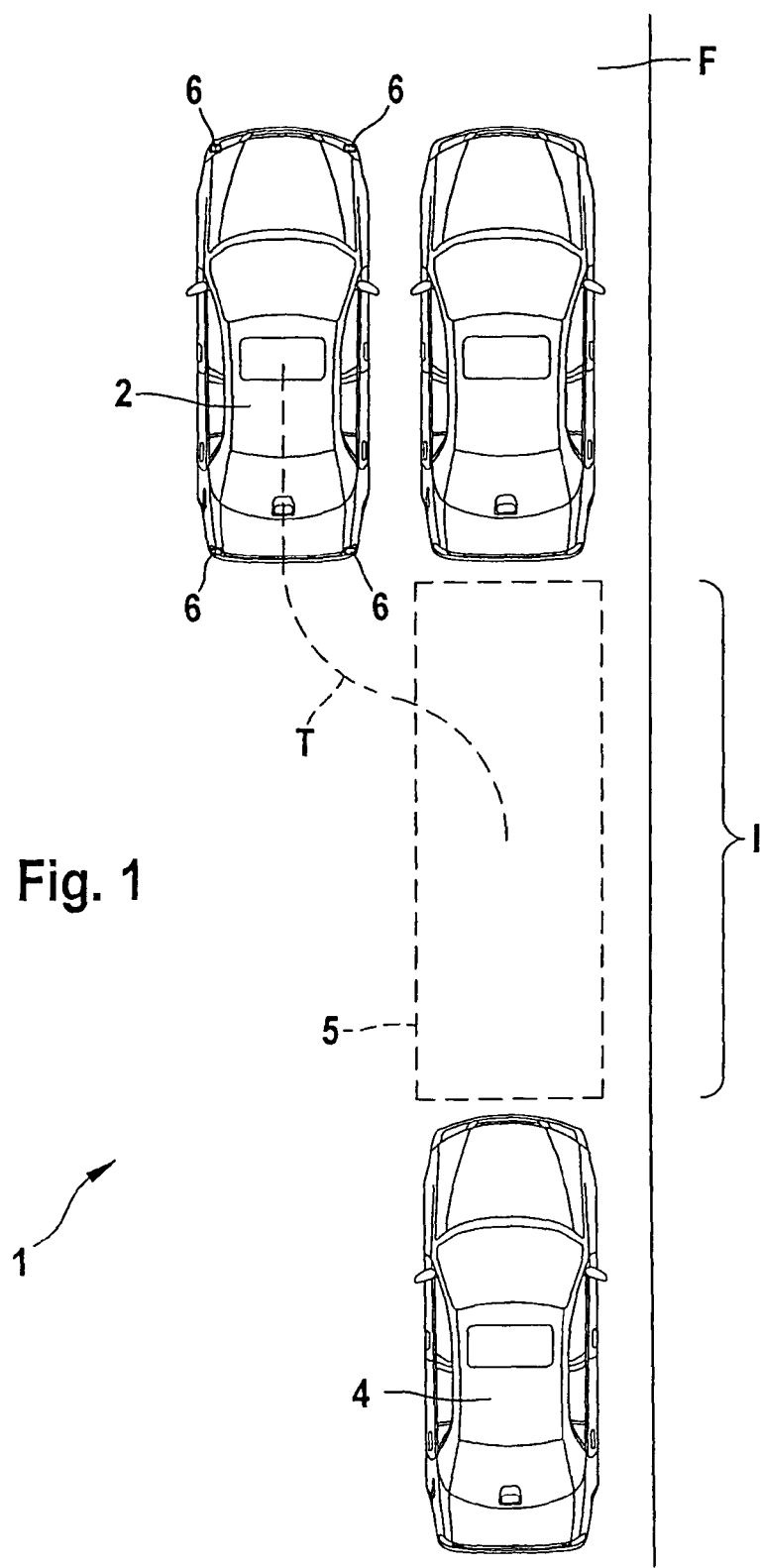
FIG. 1 shows a parking situation which is relevant for the method according to the present invention.
Figure 2:
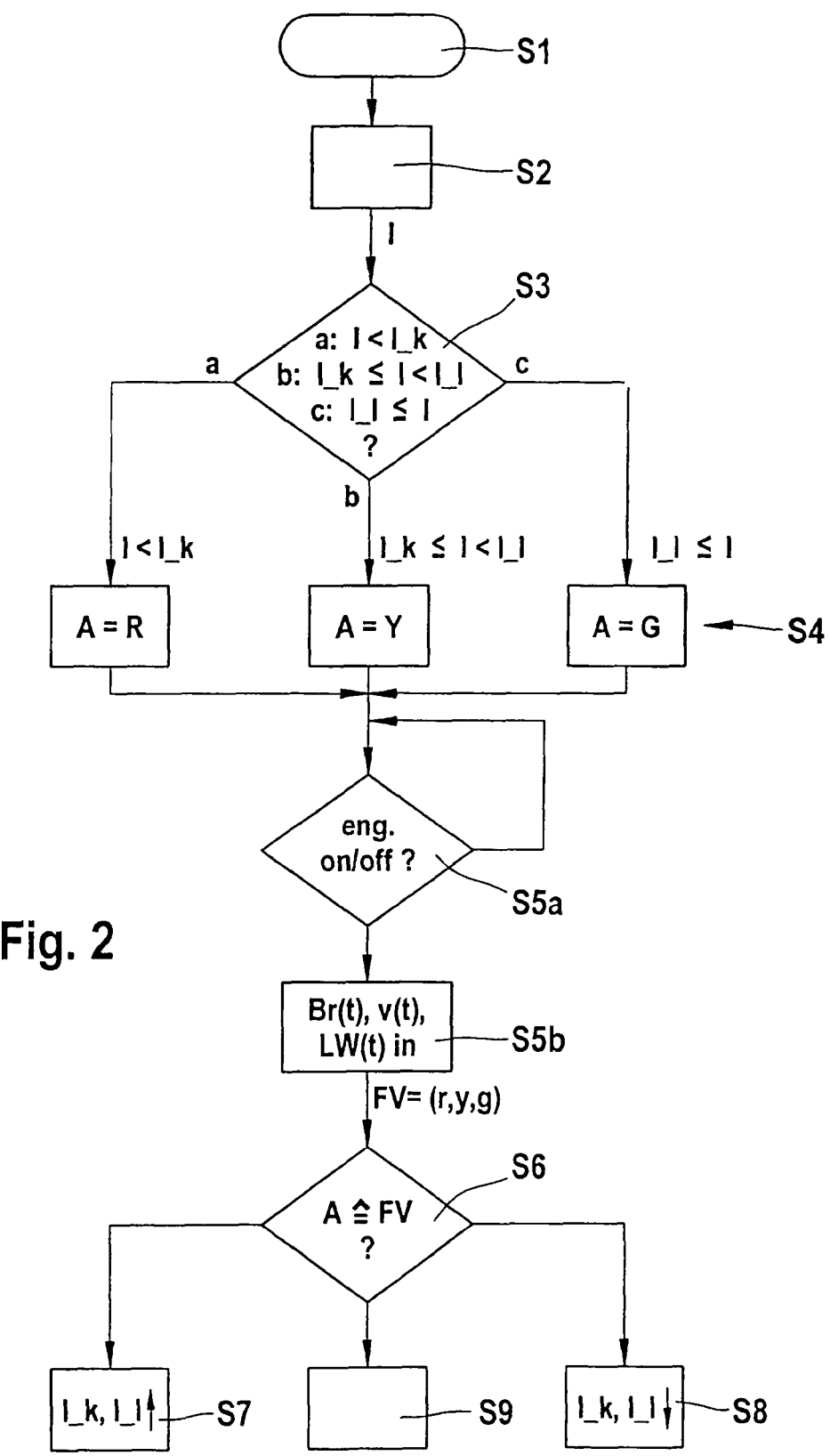
FIG. 2 shows a flow chart of the method according to the present invention.

In traffic situation 1 shown in FIG. 1, a vehicle 2 travels in a lane F alongside parked vehicles 3, 4. According to step S 1 in FIG. 2, a procedure for parking spot measurement (PSM) is started. The driver of vehicle 2 pinpoints a parking spot 5 between vehicles 3, 4. Sensors 6, ultrasound, radar, or stereo camera-based, for example, which may be integrated into the bumpers, for example, determine in step S 2 a length l of parking spot 5 in a manner known per se. The method for parking spot measurement may be carried out at a standstill of vehicle 2 or during travel alongside parking spot 5. Length l and the lateral position of parking spot 5 may possibly subsequently be used for a parking assist method or a park pilot method for determining a trajectory T of vehicle 2 into parking spot 5 under output of steering recommendations and driving direction recommendations, for example.

In decision step S 3, determined length l is compared to a pre-stored lower limiting value l_k, which represents a minimum required parking spot length, and to an upper limiting value l_l above which an easy parking operation is indicated. A corresponding indicator signal A, e.g., a color signal, is output in step S 4 as a function of the comparison. Indicator signal A, for example, may be displayed by illuminating one of multiple adjacent color surfaces of a traffic light-like display device.

In case a, according to which determined length l of parking spot 5 is below lower limiting value l_k, i.e., l<l_k, the system detects that a parking operation is not possible. A red indicator signal A=R is output to the driver in step S 4.

In case b, according to which l is greater than/equal to l_k and smaller than l_l, i.e., l_k≦l<l_l, the system detects that a medium-difficult parking operation is possible. A yellow indicator signal A=Y, for example, is accordingly output to the driver via the display device.

In case c, according to which l≧l_l, the system detects that an easy parking operation is possible and outputs a corresponding green indicator signal A=G to the driver in step S 4.

In step S 4, recording of vehicle dynamics data such as velocity v (t) and steering angle characteristic LW (t) and brake signal Br (t) as well as possibly additional measured variables is advantageously started via the on-board CAN bus, for example. Recording may also be started, for example, only when the driver starts a park pilot (PP) function or a parking assist (PA) function.

In step 5*a* it is checked whether the parking operation is complete. Successful completion of the parking operation is detected, for example, when the engine is shut off with a corresponding "eng. on/off" signal via the CAN bus. An aborted parking operation may be detected, for example, when the engine is not shut off after a time has elapsed after the beginning of the parking operation.

In step S 5*b*, the temporarily stored vehicle dynamics data is read in and evaluated during the parking operation of vehicle 2. When the driving behavior is evaluated, basically only two values may be established, namely successful parking operation or unsuccessful parking operation. However, a more accurate evaluation takes place here using, for example, the steering frequency, the period of the parking operation and/or the number of driving direction changes, i.e., the forward and backward driving frequency. An evaluation signal FV, characterizing the driving behavior, is output and stored and may assume, for example, the value y, i.e., medium-difficult parking operation, value g, i.e., easy parking operation, or possibly value r, i.e., aborted parking operation.

Signals A=(R, Y, G) and FV=(r, y, g) are compared in step S 6. Subsequently, no change may occur, limiting values l_k and/or l_l may not be increased in step S 7, and limiting values l_k and/or l_l may not be decreased in step S 8.

In the case of A=G or A=Y and FV=r, lower limiting value l_k and upper limiting value l_l may be raised. In the case of A=Y or A=R und FV=g, one and/or both limiting values l_k, l_l may subsequently be reduced. If the parking operation was in fact successful, but a medium-difficult parking operation was determined, i.e., FV=y, one or both limiting values l_l and/or l_k may be raised in step S 8 in the case of A=G or A=Y; in the case of A=R, one or both limiting values l_l and/or l_k may be reduced in step S 7.

According to the present invention, the change of the limiting value or both limiting values may also be carried out in a more differentiated manner, by forming a continuous value for FV and a change proportionate to the deviation of indicator signal A from FV. Limiting values l_l and l_k, corrected in steps S 7, S 8, subsequently replace the previously stored values l_l, l_k. Instead of replacing the old values with the determined current values, a long-term determination over multiple parking operations is also possible.

Limiting values l_l and l_k may basically also be stored in vehicle 2 in a driver-specific manner if vehicle 2 is allowed to be driven by multiple persons generally having different driving behaviors and skills. In this case, a query may be performed upon the start of the drive to determine who is driving the vehicle. An adaptive method is thus created with constant adaptation of limiting values l_l and l_k to the driving behavior of the driver. In one embodiment, the personal parking evaluation is personalized, e.g., via a corresponding key selection corresponding to a selection of a personalized, stored seating position.

Parking behavior of a driver may be evaluated as follows, for example: If, during parking, a minor change in the steering direction, a minor change in the driving direction, and a short parking period are determined, the parking spot was obviously large enough for the driver. This may be the case, for example, when a maximum of three steering direction changes, a maximum of one driving direction change, and a maximum parking period of 20 seconds were needed. The limiting values may remain unchanged in this case. However, they may possibly be slightly lowered after a certain time if very good results are consistently achieved for comparable parking spots. The driver, who may now drive in a more skilled manner, may also obtain positive evaluations in the future for smaller parking spots. However, if more steering direction changes, driving direction changes, and longer parking periods are regularly determined for positively rated parking spots, the limiting value is raised. The correction should depend on how many corrections the driver makes. If four to five steering direction changes, three to four driving direction changes, and a parking period of more than 25 seconds are needed for a certain parking spot size, it may be a difficult parking spot for the driver. A parking spot in which more than ten steering direction changes, more than six driving direction changes, and a parking period of approximately one minute are needed should be evaluated in such a way that it is indicated to the driver as being impossible.

For the evaluation it should be taken into account that individual poor conditions, which may occur, for example, when parking on a steep slope or on adverse road coverings such as snow or gravel, as well as other roadway impairments, may not interrupt the entire evaluation. Isolated occurrences should therefore not be taken into account. This is particularly true for systems in which a personalization is not provided or in the event of an erroneous personalization. Therefore, a personalized evaluation of a parking spot preferably takes place only when an average can be established over a sufficient number of parking operations, e.g., over at least five parking operations.

What is claimed is:
1. A method for determining a parking spot, comprising:
measuring a parking spot;
outputting a measured length of the parking spot;
comparing the measured length to at least one limiting value;
determining an indicator signal;
outputting the indicator signal to a driver;
recording vehicle dynamics signals during a parking operation;
evaluating the parking operation on the basis of the recorded vehicle dynamics signals;
outputting an evaluation signal; and
changing the at least one limiting value as a function of the evaluation signal and the indicator signal.

2. The method as recited in claim 1, further comprising:
comparing the evaluation signal and the indicator signal to one another, wherein:
no change to the at least one limiting value occurs when the evaluation signal and the indicator signal correspond, and
the at least one limiting value is changed in the event of a deviation.

3. The method as recited in claim 1, wherein at least one lower limiting value, which indicates a minimally possible length of the parking spot, and one upper limiting value, which separates an easy parking section from a medium-difficult parking section, are used for the comparing and are changed as a function of the evaluation signal and the indicator signal.

4. The method as recited in claim 3, further comprising:
raising the lower limiting value if a possible parking operation is determined from the measured length of the parking spot and an unsuccessful parking operation is determined as the evaluation signal.

5. The method as recited in claim 3, further comprising:
raising the upper limiting value.

6. The method as recited in claim 3, further comprising:
reducing the lower limiting value and the upper limiting value if a successful, easy parking operation is determined and the measured length of the parking spot is in a middle range between the lower limiting value and the upper limiting value.

7. The method as recited in claim 1, further comprising:
performing a quantitative comparison of the indicator signal and the evaluation signal; and
establishing an amount of a change of the at least one limiting value as a function of a size of a deviation.

8. The method as recited in claim 1, further comprising:
outputting a visual color signal as the indicator signal by:
outputting a red color signal when the measured length of the parking spot is in a lower range below a lower limiting value,
a yellow color signal when the measured length is in a middle range between the lower limiting value and an upper limiting value, and
a green color signal when the measured length is in an upper range above the upper limiting value.

9. The method as recited in claim 1, wherein the changing of the at least one limiting value is carried out via a long-term determination over multiple parking operations.

10. The method as recited in claim 1, wherein at least one of the following time-dependent signals is used as vehicle dynamics signals:
vehicle velocity,
steering angle, and
brake signal.

11. The method as recited in claim 1, further comprising:
detecting an end of the parking operation when a vehicle is situated within the determined parking spot and an engine is shut off.

12. The method as recited in claim 11, further comprising:
determining an unsuccessful parking operation when the engine is not shut off in the parking spot within a predefined time period.

13. The method as recited in claim 1, further comprising:
identifying a respective driver; and
assigning an evaluation of a parking behavior to the identified driver.

* * * * *